No. 740,071. PATENTED SEPT. 29, 1903.
F. J. ALLEN.
FOOT REST OR SEAT.
APPLICATION FILED JAN. 10, 1903.
NO MODEL.

Witnesses:
Walter E. Lombard
Josiah E. Reid.

Inventor:
Frederick J. Allen
per Edward Dummer
Atty.

THE NORRIS PETERS CO., PHOTO-LITHO., WASHINGTON, D. C.

No. 740,071. Patented September 29, 1903.

UNITED STATES PATENT OFFICE.

FREDERICK J. ALLEN, OF SOMERVILLE, MASSACHUSETTS.

FOOT-REST OR SEAT.

SPECIFICATION forming part of Letters Patent No. 740,071, dated September 29, 1903.

Application filed January 10, 1903. Serial No. 138,575. (No model.)

*To all whom it may concern:*

Be it known that I, FREDERICK J. ALLEN, a citizen of the United States, residing at Somerville, in the county of Middlesex and State of Massachusetts, have invented a new and useful Improvement in Foot-Rests or Seats, of which the following is a specification, reference being had to the accompanying drawings.

The object of my invention is to provide a rest for the foot or a seat which when not supporting the weight of the foot or person will be on casters, so as to be readily moved on the floor, but when supporting said weight will bear as to the whole or a part directly on the floor, (without the intervention of casters,) so that it will not be easily or inconveniently movable on the floor.

Figure 1:
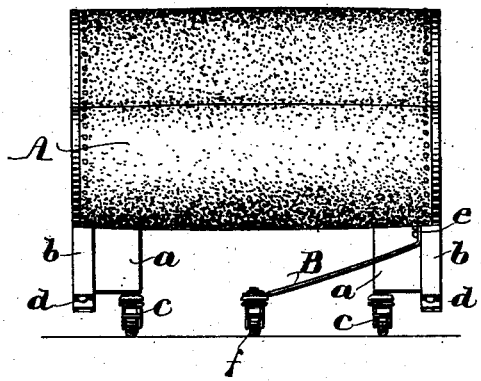
Figure 2:
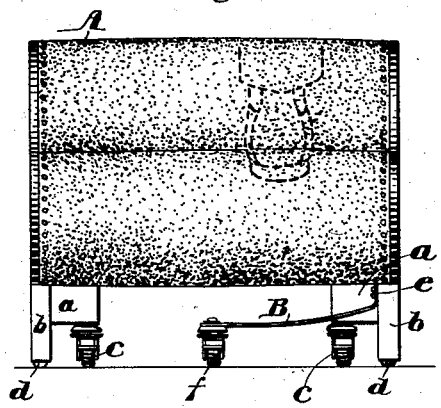
Figure 3:
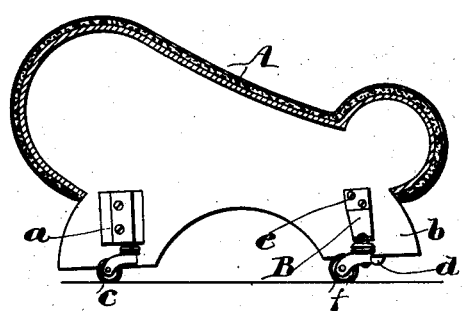
Figure 4:
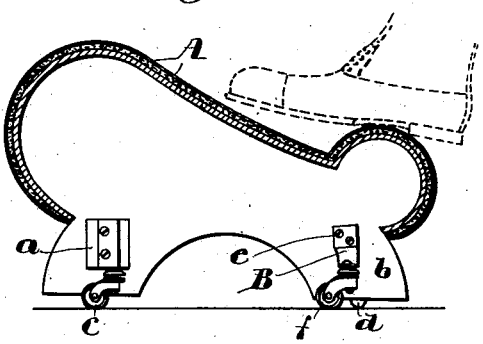

In the drawings, Figures 1 and 2 show a front elevation of a foot-rest embodying my invention, and Figs. 3 and 4 are vertical sections of the same. In Figs. 1 and 3 the parts of the device are shown in their relative position when not supporting a weight, as of the foot, and in Figs. 2 and 4 when said weight is thereon.

The body A of the device is of such shape and dimensions as may be desired, being, as shown, suitable for a foot-rest, having two rear legs $a\ a$ and two front legs $b\ b$. To each of the legs $a$ is secured in the usual manner a caster $c$ of ordinary construction. Each of the legs $b$ is formed to meet the floor, as hereinafter specified, having, preferably, a rubber extension or tip $d$. A spring B, preferably of the form shown, is fastened at one end $e$ to the body or a leg of the device and bears at the other end an ordinary caster $f$ in position under the front part of the rest or seat. The spring is of such elasticity that the caster $f$ bearing on the floor the front part of the device will be sustained thereby, so that the legs $b\ b$ will not touch the floor when there is no weight, as of the foot, thereon, and the device, being wholly on casters, may be readily moved as desired; but when the device has such weight thereon the legs $b\ b$ will bear on the floor and by their contact therewith and pressure thereon prevent such movement of the rest or seat as would be inconvenient or objectionable.

I claim as my invention—

1. The combination of a leg for an article of furniture, a caster, and a spring, the spring being between the caster and leg and of such tension, and the caster, spring and leg being of such position relative to each other, that the leg will be held out of contact with the supporting-floor, but will bear directly on said floor when the spring is compressed, substantially as and for the purpose set forth.

2. The combination with a foot-rest or seat, of casters and a spring, part of the casters being connected directly with a part of the foot-rest or seat, the spring being between another part of the foot-rest or seat and a caster therefor, in such relation thereto, and of such tension, that compression of the spring will cause said other part of the foot-rest or seat to bear directly on the supporting-floor, substantially as and for the purpose set forth.

3. The combination of the body of a foot-rest or seat having four legs, two of said legs having casters connected directly thereto, two of said legs being provided with rubber extensions or tips, and a spring bearing a caster and connected with said foot-rest or seat, substantially as and for the purpose set forth.

FREDERICK J. ALLEN.

Witnesses:
 EDW. DUMMER,
 ARTHUR W. SENTER.